(12) United States Patent
Jensen et al.

(10) Patent No.: US 8,838,652 B2
(45) Date of Patent: Sep. 16, 2014

(54) TECHNIQUES FOR APPLICATION DATA SCRUBBING, REPORTING, AND ANALYSIS

(75) Inventors: Nathan Blaine Jensen, Spanish Fork, UT (US); Volker Gunnar Scheuber-Heinz, Pleasant Grove, UT (US); Stephen R Carter, Spanish Fork, UT (US); Charles Matthew Morgan, Springville, UT (US)

(73) Assignee: Novell, Inc., Provo, UT (US)

( * ) Notice: Subject to any disclaimer, the term of this patent is extended or adjusted under 35 U.S.C. 154(b) by 565 days.

(21) Appl. No.: 12/050,414

(22) Filed: Mar. 18, 2008

(65) Prior Publication Data

US 2009/0240694 A1  Sep. 24, 2009

(51) Int. Cl.
*G06F 17/30* (2006.01)

(52) U.S. Cl.
CPC ..................................... *G06F 17/30* (2013.01)
USPC ............ 707/803; 707/613; 707/641; 707/792

(58) Field of Classification Search
None
See application file for complete search history.

(56) References Cited

U.S. PATENT DOCUMENTS

| | | | |
|---|---|---|---|
| 6,148,298 A | 11/2000 | LaStrange et al. | |
| 6,507,843 B1 | 1/2003 | Dong et al. | |
| 7,219,104 B2 | 5/2007 | Lang et al. | |
| 7,240,279 B1 * | 7/2007 | Chartier et al. | 715/210 |
| 7,505,888 B2 * | 3/2009 | Legault et al. | 703/22 |
| 2003/0208460 A1 * | 11/2003 | Srikant et al. | 707/1 |
| 2003/0225752 A1 | 12/2003 | Bakalash et al. | |
| 2004/0103124 A1 * | 5/2004 | Kupkova | 707/203 |
| 2004/0181543 A1 * | 9/2004 | Wu et al. | 707/102 |
| 2005/0039117 A1 | 2/2005 | Lwo | 715/513 |
| 2005/0060332 A1 * | 3/2005 | Bernstein et al. | 707/100 |
| 2006/0117057 A1 * | 6/2006 | Legault et al. | 707/102 |
| 2006/0136428 A1 * | 6/2006 | Syeda-Mahmood | 707/100 |
| 2006/0155725 A1 * | 7/2006 | Foster et al. | 707/100 |
| 2006/0238919 A1 | 10/2006 | Bradley | |
| 2007/0239769 A1 * | 10/2007 | Fazal et al. | 707/102 |
| 2008/0027958 A1 | 1/2008 | Kapoor et al. | |
| 2008/0046874 A1 * | 2/2008 | Kostoulas et al. | 717/143 |
| 2008/0052294 A1 * | 2/2008 | Larkin et al. | 707/10 |
| 2009/0006156 A1 * | 1/2009 | Hunt et al. | 705/7 |
| 2009/0006315 A1 * | 1/2009 | Mukherjea et al. | 707/2 |
| 2009/0070237 A1 * | 3/2009 | Lew et al. | 705/28 |
| 2009/0240726 A1 * | 9/2009 | Carter et al. | 707/103 R |

OTHER PUBLICATIONS

Leigh Dodds, "Schematron: validating XML using XSLT", Apr. 2001, ingenta ltd, pp. 1-16.*
Chimezie Ogbuji, "Validating XML with Schematron", Nov. 22, 2000, XML.com, pp. 1-6.*
James W. Hunt and M. Douglas McIlroy, "An Algorithm for Differential File Comparison", Jun. 1976, Bell Laboratories, Computing Science Technical Report, pp. 1-9.*

* cited by examiner

*Primary Examiner* — Mohammad S Rostami
(74) *Attorney, Agent, or Firm* — Schwegman, Lundberg & Woessner, P.A.

(57) ABSTRACT

Techniques for application data scrubbing, reporting, and analysis are presented. A plurality of data sources are analyzed in accordance with their schemas and matching rules. Merging rules are applied to merge a number of data types across the data sources together. A report is produced for inspection and a master data source is generated. The processing can be iterated with rules modified in response to the report for purposes of refining the master data source.

25 Claims, 3 Drawing Sheets

TECHNIQUES FOR APPLICATION DATA SCRUBBING, REPORTING, AND ANALYSIS

BACKGROUND

A typical enterprise in today's highly automated environment can have a variety of systems and data sources. Each system can produce different versions of the same data types that the enterprise manages and tracks. So, similar or same data is often repetitively stored within the enterprise. In fact, with some data sources the information may be incomplete whereas in other data sources the information may be more robust.

The above situation occurs for a variety of reasons. Most notably, as technology evolves an enterprise may find it more convenient and more efficient, at a particular point in time, to simply replicate some data sources rather then undergo expensive porting exercises to make newer systems and older systems compatible with one another. Over time, the enterprise can end up with data sources and systems that begin to impair the effectiveness of the enterprise. The enterprise may then undergo expensive and time consuming internal fabrication overhauls to bring their infrastructure up-to-data and make it more competitive with the industry. In fact, such scenarios are part of the normal lifecycle of today's enterprises.

One problem with internal infrastructure overhauls is that they can be so large that by the time they finish, the enterprise needs to begin yet another overhaul. The capital expense and human effort that it takes for these overhauls can significantly alter an enterprise's financial picture on its annual report.

Furthermore, enterprises generally do not have an automated mechanism to analyze, report, and cleanse the enterprise data as a whole. As a result huge manual efforts are often undertaken to regularly analyze the data on an individual data set basis. This situation can lead to incorrect enterprise reporting and missed business opportunities for the enterprise. The situation also ensures that the enterprise is not moving toward an integrated and unified view of its core asset, which is information in today's world economy.

Thus, improved and automated techniques are needed enterprise data management and analysis.

SUMMARY

In various embodiments, techniques for application data scrubbing, reporting, and analysis are presented. More specifically and in an embodiment, a method is provided for data analysis. A first schema for a first data source and a second schema for a second data source are acquired. The first and second schemas are used for detecting data types and patterns for the data types in both the data sources. Next, some first patterns associated with the first data source are matched to other second patterns associated with the second data source in response to matching rules. Finally, a report is generated that identifies the matched first patterns of the first data source to the second patterns of the second source.

DETAILED DESCRIPTION

A "schema" as used herein refers to a file or table that defines a data source's structure and syntax. Some example schemas can include extensible markup language (XML) schemas, relational database schemas, directory schemas, and the like. A schema describes limitations on the structure of the universe of data that can be associated with a particular data source.

A "data source" refers to a repository for the data that a schema defines. The repository can be a relational database table, a file, a directory, etc. Moreover, a data source is produced by applications in an automated fashion or produced in a semi-automated fashion via interfaces that users interact with. Moreover, a data source can include data produced in a strictly automated fashion via processing applications and at the same time include manually entered data received from a user via a Graphical User Interface (GUI), such as World-Wide Web (WWW) site via WWW pages and interfaces, a SQL update, proprietary applications' interfaces, etc.

Various embodiments of this invention can be implemented in existing network architectures. For example, in some embodiments, the techniques presented herein are implemented in whole or in part in the Novell® network and proxy server products, directory services products, operating system products, and/or identity based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
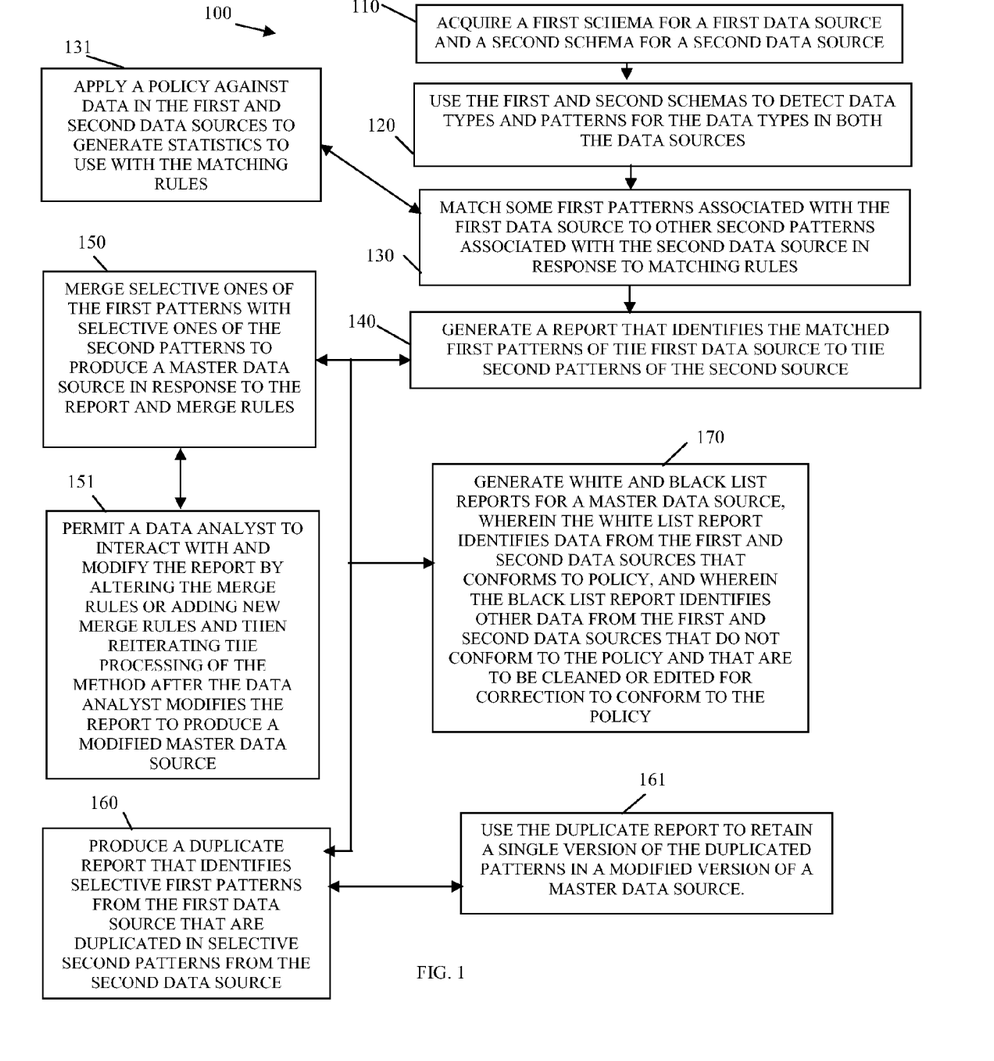
FIG. 1 is a diagram of a method for data analysis, according to an example embodiment.

FIG. 1 is a diagram of a method 100 for data analysis, according to an example embodiment. The method 100 (hereinafter "data analysis service") is implemented in a machine-accessible and readable medium. The data analysis service is operational over and processes within a network. The network may be wired, wireless, or a combination of wired and wireless.

At 110, the data analysis service acquires a first schema for a first data source and a second schema for a second data source. The schemas include the structural and syntactical restrictions associated with identifying and validating data types within the data housed in the data sources. The acquisition of the first and second schemas can occur in a variety of manners.

For example, a data analyst may specifically identify the schemas and the data sources via an interface, such as a World-Wide Web (WW) page/form. Alternatively, the data sources may be identified and the unique identities associated with the data sources permit a repository to be queried and the proper schemas returned. In another embodiment, by having a name or identifier of a data source a policy may be used to construct a name or identifier for the corresponding schema. Once the schema name or identifier is know, the data analysis service can acquire the schema of interest.

At 120, the data analysis service uses the first and second schemas to detect data types and patterns for those data types in both the data sources. In other words, the schema defines data types and their corresponding syntax and/or structure. The data analysis service uses this information to parse the data sources and identify data types and patterns from data in the data sources. In an embodiment, the schemas are defined in extensible markup language (XML) as XML schema definitions (XSD's).

For example, a schema entry for a data source may identify a data type or field as phone-number defined as follows: item="<pn>[0-9](10)</pn>," where "<pn>" and "</pn>" are starting and ending delimiters in the data source for parsing and recognizing a phone-number data type that is defined as being a string of digits "[0-9]" having a length of 10 "(10)" characters. This is but one example others are possible without departing from the teachings herein. The point is that the schema provides at least some structure and syntax for initially recognizing and parsing data types and patterns that occur in the data source to which the schema is associated.

Next, at 130, the data analysis service matches some first patterns associated with the first data source to other second patterns associated with the second data source in response to matching rules. The matching rules provide a link between data types or patterns across the two data sources. In some cases, when the identifiers and structure are identical no matching rule is needed to match a first pattern to a second pattern. In other cases, the matching rules can be acquired from a Meta schema that ties the first schema to the second schema, such that the matching rules are pre-existing and acquired via inspection of the Meta schema. In yet other situations, the matching rules are acquired in response to a predefined policy that associates patterns or data types between the two schemas. The matching rules are predefined but as stated above can be acquired in a variety of manners and from a variety of sources. An example matching rule may match a first data type identified in the first data source as phone-number with a second data type identified in the second data sources as contact-information, even when the first data type is 10 digits (U.S. area code plus traditional 7 digits) and the second data type is 13 digits (3 digit country code, 3 digit area code, and 7 digit phone number). So, the matching rule provides a mechanism to automatically match patterns or data types across the two data sources.

It is noted that although only two data sources are discussed for purposes of illustration, the teachings presented herein are not so limited, as many data sources and schemas can be processed by the data analysis service at one time and merge rules applied.

According to an embodiment, at 131, the data analysis service applies policy against the data in the first and second data sources to generate statistics to use with the matching rules. In other words, Meta conditions defined in policies can indicate that certain metrics about the data in the data sources are to be captured as the data sources are parsed and being analyzed. Some metrics may include pattern variations for each defined data type, frequency of a particular pattern for a particular data type that occurs within a data source, identifying data source entries where sub data types are missing under a parent data type when required to present in accordance with that data source's schema, etc. These metrics or statistics can be used as conditions that are evaluated for the rules to take actions, such as do not match entries that lack a corresponding sub data type required to be present, etc. So, application of policy can be used to generate statistics that are fed into the matching rules and the matching rules may rely on or use the statistics as part of the application.

At 140, the data analysis service generates a matching report that identifies the matched first patterns of the first data source to the corresponding second patterns of the second data source. The matching report includes a variety of information, such as: identifiers for data types, statistics related to the data types, patterns, statistics for the patterns, identifiers for the matching rules, matching rules applied to particular ones of the data types and/or patterns, etc.

According to an embodiment, at 150, the data analysis service merges selective ones of the first patterns with selective ones of the second patterns to produce a master source in response to merge rules. So, data associated with some matched patterns are merged together in a single master data source. This permits a single master data source to be generated for the enterprise in response to matching patterns and then enforcing merge rules.

As an example merge rule, suppose a data type or pattern associated with a user in a first data source includes such sub data types and data that identifies office location, name, email and supervisor for that user. Now suppose the second data source includes a matching data type or pattern for an employee that includes such sub data types and data that identifies social security number (SSN), salary, date of hire, age, dependents, and department number. The matching rules, which are processed by the data analysis service, at 130 associates the user and employee data types together; and a merge rule that the data analysis service processes, at 150, results in combining the data associated with the user of the first data source and the data associated with the employee of the second data source together in a master data source as a single master data source for the enterprise. It is noted that a single master data source schema may be used to acquire the merge rule that permits the data merge.

In an embodiment, at 151, the data analysis service permits a data analyst to interact with and modify the report, which was generated at 140, by altering the merge rules or adding new merge rules and then reiterating the processing 110-150 after the data analyst modifies the report. This produces a modified master data source. It is also noted that the report may include the merge rules or references to the merge rules or alternatively the merge rules may be completely separate from the report. Additionally, the data analysis service is adapted to check for the existence of a pre-existing report when the data analysis service iterates the processing at 110 (at startup or initialization for a new processing iteration). The metrics and content of the report can be used to drive and modify the matching and merging of the data.

In an embodiment, at 160, the data analysis service produces a duplicate report that identifies selective first patterns from the first data source that are duplicated in selective second data patterns from the second data source. The duplicate report essentially identifies data that is duplicated across the data sources. At 161, the data analysis service can use the duplicate report to retain a single version of the duplicated pattern in a modified version of a master data source. Whether duplicates are retained or removed from a master data source that combines the first and second data sources can be driven by policy.

According to an embodiment, at 170, the data analysis service generates white and black list reports for a master data source. The white list identifies data from the first and second data sources that conforms to policy. The black list report identifies other data from the first and second data sources that do not conform to the policy and that are to be cleaned or edited for correction to conform to the policy. As an example, suppose that every employee data type is to include a sub data type associated with home address and that a few entries in one of the data sources, for example the first data source, lack a home address. This data can be flagged in the black list report along with pointers to its location within the first data source or identifying information such that the data can be quickly located within the first data source. Next, either an automated process or an editor can take the report and fix the data. This is but one example of many that can be achieved using the black list report. In fact, if a large volume of black list entries are present automated scripts may be used to correct the issues.

The data analysis service is meant to be an iterative and interactive process that permits enterprise data to be analyzed, cleansed, and reported on. So, the data analysis service can iterate the first and second data sources multiple times producing revised reports (matching, merging, duplicate, white list, and/or black list reports). A data analyst inspects the reports and interactively modifies the reports, rules (matching and/merging rules), and/or policy and re-executes the data analysis service. The end result is a master data source that conforms to enterprise data policies and reports on the state of the enterprise data sources that comprise the master data source.

Figure 2:
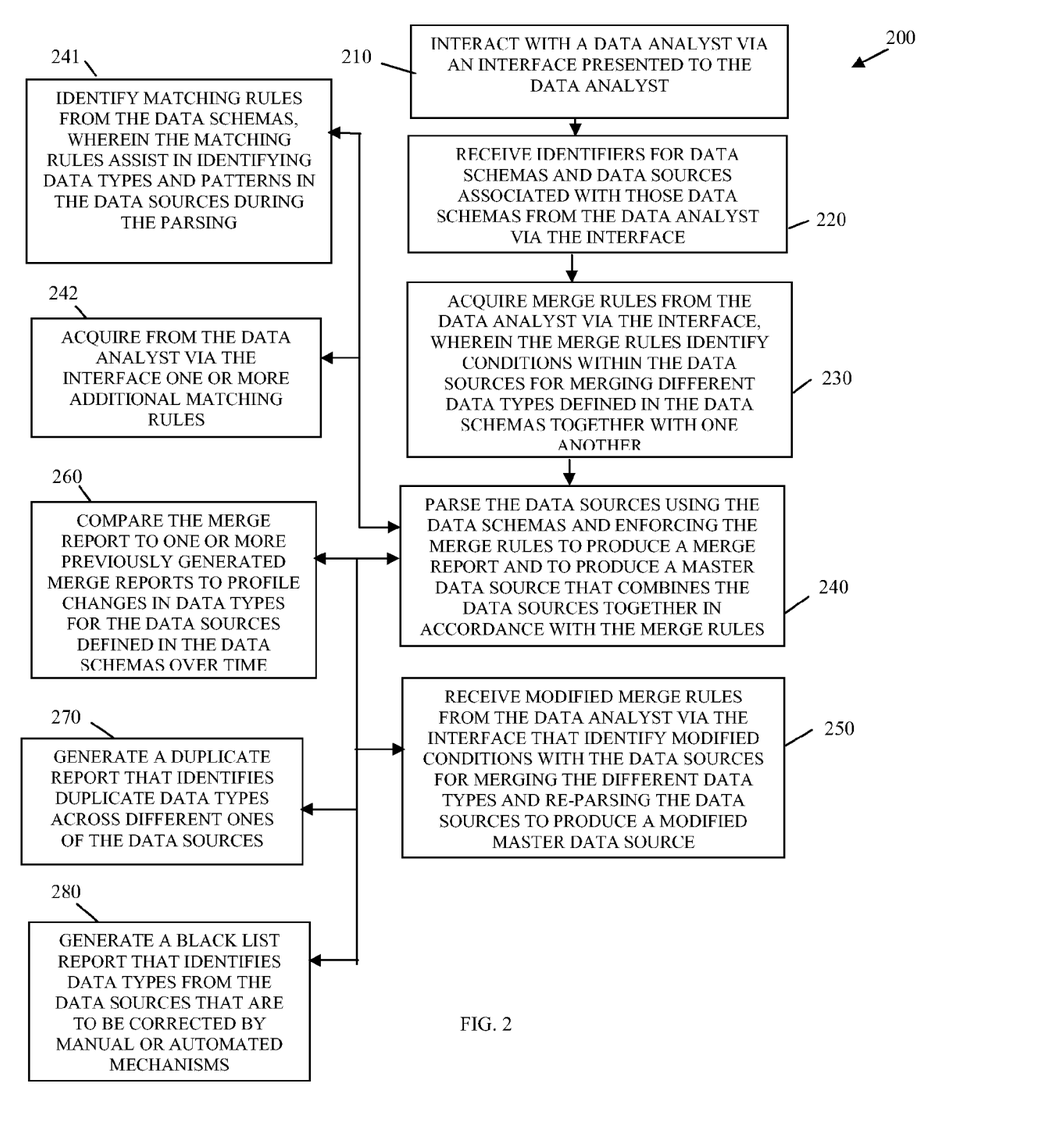
FIG. 2 is a diagram of a method for processing a data analysis tool, according to an example embodiment.

FIG. 2 is a diagram of a method 200 for processing a data analysis tool, according to an example embodiment. The method 200 (hereinafter "data analysis tool" is implemented in a machine-accessible and readable medium and is operational over a network. The network may be wired, wireless, or a combination of wired and wireless.

In an embodiment, the data analysis tool service presents a different and enhanced perspective to the data analysis service, which is represented by the method 100 of the FIG. 1 and which is discussed above.

At 210, the data analysis tool interacts with a data analyst via an interface presented to the data analyst. The interface can be any Graphical User Interface (GUI) or command line Application Programming Interface (API) that permits the data analyst to access a variety of features associated with the data analysis tool for purposes of provided structured and automated mechanisms for analyzing, cleansing (scrubbing), and reporting on enterprise data.

In an embodiment, the interface is a one or more WWW pages accessible via an Internet WWW browser. In another case, the interface is a relational database API. In still another situation, the interface is a directory-based API.

At 220, the data analysis tool receives identifiers for data schemas and data sources associated with those data schemas from the data analyst via the interface. So, the data analyst identifies a set of data sources that the data analyst believes are related and wants to analyze, scrub, and generate reports for. This can be done in a variety of manners. The analyst may identify a Meta schema that provides the details for acquiring the individual data schemas and identifiers for the corresponding data sources. Alternatively, the data sources are identified and the schemas acquired in response to the identifiers associated with those data sources. In still another case, the schemas are identified and the data sources acquired there from.

At 230, the data analysis tool acquires merge rules from the data analyst via the interface. The merge rules identify conditions within the data sources for merging different data types defined in the data schemas together with one another. The analyst may manually enter some merge rules via the interface. The analyst can also identify a repository for acquiring the merge rules. In an embodiment, the analyst can identify a master schema that ties the data sources together in a master data source and the master schema includes the merge rules.

At 240, the data analysis tool parses the data sources using the data schemas. When the data source is parsed, patterns are matched across the data sources and the merge rules are enforced against the matched patterns. Next, the data analysis tool produces a merge report and a master data source that combines the data sources together in accordance with the merge rules.

In an embodiment, at 241, the data analysis tool identifies matching rules from the data schemas. The matching rules assist in identifying data types and patterns in the data sources during the parsing process. For example, one schema entry may provide the pattern conditions that identify an employee's phone number as "(NNN) NNN-NNNN" where N represents a numeric character. Here, a phone number is represented as a 10 digit number having separators of parenthesis, spaces, and a dash; the 10 digit number includes an initial 3 digit area code. Another schema may include an entry for phone number that has pattern conditions as follows: "NNN.NNN.NNN.NNNN." This last schema entry includes a country code (3 digits), an area code (3 digits), and a traditional phone number (7 digits); the last schema also uses a separator as a period character.

According to an embodiment, at 242, the data analysis tool acquires from the data analyst, via the interface, one or more matching rules. So, an analyst can interactively supply matching rules to the data analysis tool for immediate enforcement during the parsing process.

In an embodiment, at 250, the data analysis tool receives modified merge rules from the data analyst, via the interface, which identifies modified conditions with the data sources for merging the different data types and for re-parsing the data sources to produce a modified master data source. In other words, the data analyst can decide in response to the merge report that modifications should be done and can use the interface to communicate the modifications as changed or even new merge rules (or matching rules) and then re-execute the parsing process of the data analysis tool to produce another version of the master data source and the merge report.

In one situation, at 260, the data analysis tool compares the merge report to one or more previously generated merge reports for profiling changes in the data types for the data sources (the data types are defined in the schemas) over a configurable period of time. This can produce a lot of useful information for the enterprise; such as the enterprise may determine that a particular authoritative data source is in fact not authoritative any longer as another application and data source has been more influential on the overall state of the enterprise data. This can be used to change policy to make the application and its data source the authority for designated data types within the enterprise data warehouse. Other information can be ascertained as well, such as determining that a more universally accepted pattern is emerging for a particular data type, for example a phone number that includes a country code in addition to an area code. Of course a variety of other useful information can be ascertained by profiling the data types over time; thus, the above presented examples were presented for purposes of illustration only and were not intended to limit the teachings presented herein to just the presented examples.

In another scenario, at 270, the data analysis tool generates a duplicate report that identifies duplicate data types across different ones of the data sources. Policy may dictate whether the duplicates are retained or whether they are removed from the master data source. The analyst may view the duplicate report via the interface or via a link provided within the interface. The analyst may also use the interface to override policy to remove or keep duplicates in the master data source. Thus, the interface and the data analysis tool provide an automated mechanism for an analyst to iteratively and interactively analyze, cleanse, and generate reports on enterprise data sources.

In still another situation, at 280, the data analysis tool generates a black list report that identifies data types from the data sources that are to be corrected by manual or subsequent automated mechanisms. Thus, if a data type in one of the data sources lacks information defined by its schema that should be present according to policy; this is identified for the analyst in the black list report. Again, the interface may permit the analyst to view the black list report and dynamically jump to the problem areas in the data sources and make manual corrections. In another case, the black list report can be used as input data to an automated script that then serially accesses the problem data sources and corrects the problem data.

Similar to the black list report, the data analysis tool can also generate white list reports for the data sources. The white list may identify statistics on the data that complies with the enterprise data policies. This may be used to determine that one data source should be used over another because it is cleaner and requires less correction.

Figure 3:
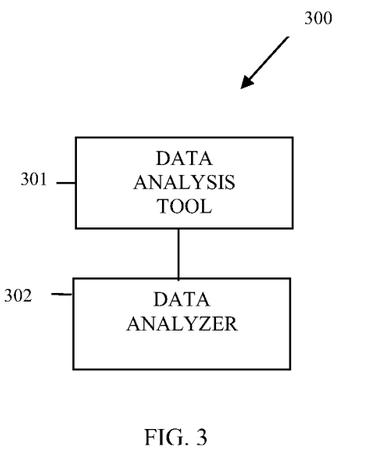
FIG. 3 is a diagram of a data analysis system, according to an example embodiment.

FIG. 3 is a diagram of a data analysis system 300, according to an example embodiment. The data analysis system 300 is implemented in a machine-accessible and readable medium as instructions that process on one or more machines of a network. Moreover, the data analysis system 300 is operational over the network; the network may be wired, wireless, or a combination of wired and wireless.

In an embodiment, the data analysis system 300 implements, among other things, the data analysis service and the data analysis tool represented by the methods 100 and 200 of the FIGS. 1 and 2, respectively.

The data analysis system 300 includes a data analysis tool 301 and a data analyzer 302. Each of these will now be discussed in turn.

The data analysis tool 301 is implemented in a machine-accessible and computer-readable medium as instructions that execute on a machine (computer or processor-enabled device) of the network. Example processing associated with some aspects of the data analysis tool 301 was presented in detail above with reference to the method 100 of the FIG. 1.

The data analysis tool 301 is configured or adapted to provide an interactive interface to a data analyst. The data analysis tool 301 permits the data analyst to identify data sources that are to be analyzed, scrubbed, and reported on.

In an embodiment, the data analysis tool 301 generates a merge report, which includes statistics regarding actions taken when the data types and patterns within the data sources are identified and which identifies the merge rules and policies applied to the data in the data sources.

According to an embodiment, the data analysis tool 301 also generates a duplicate report that identifies duplicate data types that span two or more of the data sources. Information regarding the duplicate report and processing associated with the duplicate report were presented in detail above with reference to the methods 100 and 200 of the FIGS. 1 and 2, respectively.

The data sources can come from a variety of enterprise information repositories or enterprise authorities, such as but not limited to: a directory, a relational database table, a file, a WWW page, output produced from an application that also processes on a machine of the network, and/or various combinations of these things.

In an embodiment, the analyst can use the data analysis tool 301 to modify one or more of the merge rules or policies during at least one iteration of the processing associated with the data analyzer 302 (the merge rules and policies, discussed below).

The data analyzer 302 is implemented in a machine-accessible and computer-readable medium as instructions that execute on the machine or a different machine of the network. Example processing associated with some aspects of the data analyzer 302 was presented in detail above with reference to the methods 100 and 200 of the FIGS. 1 and 2, respectively.

The data analyzer 302 acquires a separate data schema for each of the data sources and uses the data schemas to parse the data sources for purposes of identifying data types and patterns in the data sources. Examples and details regarding this processing were discussed in detail above with reference to the methods 100 and 200 of the FIGS. 1 and 2, respectively.

The data analyzer 302 uses merge rules and policies to merge some of the data types and their corresponding data from the data sources together in a master data source. The merge rules and policies were discussed in detail above with reference to the methods 100 and 200 of the FIGS. 1 and 2, respectively.

The data analysis tool 301 and the data analyzer 302 combine to provide an interactive and iterative mechanism for a data analyst to have data sources of an enterprise analyzed, scrubbed, and reported on. Specifically, the analysis includes detecting patterns and data types in an automated fashion using the schemas and producing statistics and reports regarding the analysis. The scrubbing or cleansing includes merging various data types and patterns in accordance with the merge rules and policies. Both the analysis and the scrubbing include reporting. An analyst can iteratively interact with the data analyzer 302 via the data analysis tool 301 to continually iterate over the data sources until a desired enterprise state for the master data source is achieved.

Figure 4:
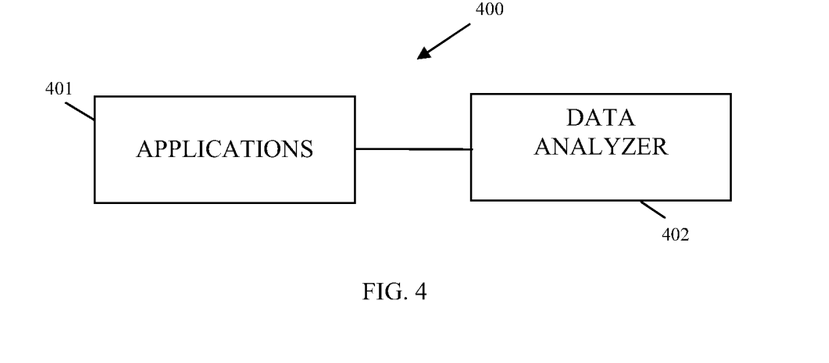
FIG. 4 is a diagram of another data analysis system, according to an example embodiment.

FIG. 4 is a diagram of another data analysis system 400, according to an example embodiment. The data analysis system 400 is implemented in a machine-accessible and computer-readable medium and is processed on machines of a network. The network may be wired, wireless, or a combination of wired and wireless. In an embodiment, the data analysis system 400 implements among other things the data analysis service and the data analysis tool service represented by the methods 100 and 200 of the FIGS. 1 and 2, respectively. Also, the data analysis system 400 presents and alternative arrangement and perspective to the data analysis system 300 discussed above with reference to the FIG. 3.

The data analysis system 400 includes applications 401 and a data analyzer 402. Each of these and their interactions with one another will now be discussed in turn.

The applications 401 are each implemented in a machine-accessible and computer-readable medium as instructions that process on same or different machines of the network.

Each application 401 produces application data housed in a particular data source. Each data source includes its own schema and that schema defines structure and syntax for data included in that data source. The schema may be directly associated with the output produced by the application 401 or by a data source that the output associated with the application 401 is stored.

So each application 401 produces application data defined by its own schema.

The data analyzer 402 is implemented in a machine-accessible and computer-readable medium as instructions that process on any machine of the network. Example processing associated with the data analyzer 402 was presented in detail within the discussion associated with the method 100 of the FIG. 1, the method 200 of the FIG. 2, and the system 300 of the FIG. 3.

The data analyzer 402 parses the application data using the schemas and further uses merging rules and policies to then map the application data to a master data source. The schemas provide matching rules for detecting data types and patterns in the application data. Example entries for schemas were provided above with reference to the methods 100 and 200 of the FIGS. 1 and 2, respectively. Also, the merging rules define via conditions which patterns or data types from one application data set that are to be merged and combined with other patterns or other data types from another application data set. The policies can override conditions defined in the merge rules and act as Meta conditions on the merging rules.

In an embodiment, the data analyzer 402 iterates the application data a configurable number of times in response to modified merge rules and modified policies. So, as stated above with reference to the methods 100 and 200 of the FIGS. 1 and 2, respectively, the data analyzer 402 is an iterative tool that a data analyst can employ to analyze, scrub, and report on the enterprise data (application data).

In one case, the data analyzer 402 generates a merge report, a duplicate data report, a white list report, and a black list report. The merge report identifies statistics associated with actions taken by the data analyzer 402 in recognizing patterns and data types and in applying merge rules and enforcing policies to produce the master data source. The duplicate data report identifies data types that are potentially duplicates of one another across different sets of the application data. The white list report provides details on the correctness of the data content included in the application data sets in view of enterprise data polices. The black list report provides details on perceived errors in the data content of the application data sets in view of the schemas and/or the enterprise data policies.

According to an embodiment, the data analyzer 402 also uses a master schema to assist in mapping the application data sets to the master data source. In other words, some or all of the merge rules and policies may be acquired via a master schema that ties and provides the mapping from the individual application schemas for the application data sets to the master data source.

In an embodiment, the data analyzer 402 acquires a unique identity for the master data source once generated from an identity manager. The identity manager processes on a machine of the network and provides unique identity assignments to resources of the enterprise for use in security enforcement within the network of the enterprise. The identity manager may also supply authentication services to the resources of the enterprise. Also, security restrictions are enforced against the master data source via the identity manager. So, the master data source can be locked down once the data analyst believes that it is in an acceptable state or condition.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for executing on a machine, comprising:
   acquiring, by the machine, a first schema for a first data source and a second schema for a second data source;
   using, by the machine, the first and second schemas to parse both data sources based on syntax and structure defined in the first and second schemas to detect data types and patterns for the data types in both the data sources;
   matching, by the machine, some first patterns associated with the first data source to other second patterns associated with the second data source in response to matching rules, the matching rules provide a link between the patterns detected in the first data source and the second data source, the matching rules obtained from a meta schema that ties the first schema to the second schema and the matching rules are acquired in response to a predefined policy that associates patterns or data types between the two schemas and the matching rules permit a first data type in the first data source to be mapped to a second data type in the second data source even when the first data type is different from the second data type;
   generating, by the machine, a report that identifies the matched first patterns of the first data source to the second patterns of the second source and the report includes metrics for the first data source and the second data source, the metrics including pattern variations for both of the data types, frequency of a particular pattern for a particular one of the data types that occurs within one of the data sources, identifying data source entries where sub data types are missing under a parent data type when required to present in accordance with one of the data source schemas; and
   iterating, by the machine and in response to interaction with a data analyst, the method processing based on modifications supplied by the data analyst for the report and the matching rules based on the metrics to produce a revised report for each iteration and on a last iteration producing a master data source that conforms to enterprise data policies and a final revised report that reports on a state of the first data source and the second data source that comprise the master data source.

2. The method of claim 1 further comprising, merging, by the machine, selective ones of the first patterns with selective ones of the second patterns to produce the master data source in response to the report and merge rules.

3. The method of claim 2 further comprising, permitting, by the machine, the data analyst to interact with and modify the report by altering the merge rules or adding new merge rules and then reiterating the processing of the method after the data analyst modifies the report to produce a modified master data source.

4. The method of claim 1, wherein matching further includes applying a policy against data in the first and second data sources to generate statistics to use with the matching rules.

5. The method of claim 1 further comprising, producing, by the machine, a duplicate report that identifies selective first patterns from the first data source that are duplicated in selective second patterns from the second data source.

6. The method of claim 5, further comprising using, by the machine, the duplicate report to retain a single version of the duplicated patterns in a modified version of a master data source.

7. The method of claim 1, further comprising generating, by the machine, white and black list reports for the master data source, wherein the white list report identifies data from the first and second data sources that conforms to policy, and wherein the black list report identifies other data from the first and second data sources that do not conform to the policy and that are to be cleaned or edited for correction to conform to the policy.

8. A machine-implemented method for executing on a machine, comprising:
   interacting, by the machine, with a data analyst via an interface presented to the data analyst;
   receiving, by the machine, identifiers for data schemas and data sources associated with those data schemas from the data analyst via the interface;
   acquiring, by the machine, merge rules from the data analyst via the interface, wherein the merge rules identify conditions within the data sources for merging different data types defined in the data schemas together with one another, the analyst identifies a master schema that ties the data sources together via the merge rules included in the master schema, and matching rules are acquired for the master schema and in response to a predefined policy that associates patterns or data types between the two schemas and the matching rules permit a first data type in a first data source to be mapped to a second data type in a second data source even when the first data type is different from the second data type;
   parsing, by the machine, the data sources using the data schemas and enforcing the merge rules to produce a merge report and to produce a master data source that combines the data sources together in accordance with the merge rules, and the merge report having metrics, the metrics including pattern variations for the first and second data types, frequency of a particular pattern for a particular one of the data types that occurs within one of the data sources, identifying data source entries where sub data types are missing under a parent data type when required to present in accordance with one of the two schemas; and
   dynamically jumping, by the machine, from the merge report to an area in one of the data sources based on interaction from a user with the merge report while the user views the metrics.

9. The method of claim 8 further comprising, receiving, by the machine, modified merge rules from the data analyst via the interface that identify modified conditions with the data sources for merging the different data types and re-parsing the data sources to produce a modified master data source.

10. The method of claim 8 further comprising, comparing, by the machine, the merge report to one or more previously generated merge reports to profile changes in data types for the data sources defined in the data schemas over time.

11. The method of claim 8, wherein parsing further includes identifying the matching rules from the data schemas, wherein the matching rules assist in identifying data types and patterns in the data sources during the parsing.

12. The method of claim 8, wherein parsing further includes acquiring from the data analyst via the interface one or more additional matching rules.

13. The method of claim 8 further comprising, generating, by the machine, a duplicate report that identifies duplicate data types across different ones of the data sources.

14. The method of claim 8 further comprising, generating, by the machine, a black list report that identifies data types from the data sources that are to be corrected by manual or automated mechanisms.

15. A machine-implemented system, comprising:
   a machine configured with a data analysis tool implemented in a non-transitory computer-readable medium and to execute on the machine; and
   the machine or a different machine of a network configured with a data analyzer implemented in a non-transitory computer-readable medium and to execute on the machine or the different machine;
   the data analysis tool is adapted to provide an interface to a data analyst that permits the data analyst to identify data sources for analysis, and the data analyzer is to acquire a separate data schema for each of the data sources and uses the data schemas to parse the data sources to identify data types and patterns, and the data analyzer uses merge rules and policies to merge some of the data types and their corresponding data from the data sources together in a master data source, the merge rules identified in a master schema that ties the data sources together, and matching rules are acquired for the master schema and in response to a predefined policy that associates patterns or data types between the two schemas, and the data analyzer produces a black list report having metrics that identifies areas in the data sources and the black list report is used as input to an automated script that serially access the data sources and make corrections at the areas identified in the back list report and the matching rules permit a first data type in a first data source to be mapped to a second data type in a second data source even when the first data type is different from the second data type, and wherein the metrics including pattern variations for the first and second data types, frequency of a particular pattern for a particular one of the first and second data types that occurs within one of the data sources, identifying data source entries where sub data types are missing under a parent data type when required to present in accordance with one of the two schemas.

16. The system of claim 15, wherein the data sources are one or more of the following: a directory, a relational database table, a file, a World-Wide Web (WWW) page, and output produced from an application that processes on a machine of the network.

17. The system of claim 15, wherein the data analyzer iterates over the data sources a configurable number of times in response to direction received from the data analyst via the data analyst tool to produced modified versions of the master data source.

18. The system of claim 17, wherein the data analyst modifies one or more of the merge rules or policies during at least one iteration.

19. The system of claim 15, wherein the data analysis tool generates a merge report that includes statistics regarding actions taking when the data types and the patterns are identified and that includes information regarding the merge rules and the policies applied.

20. The system of claim 15, wherein the data analysis tool generates a duplicate report that identifies duplicate data types that span two or more of the data sources.

21. A machine-implemented system, comprising:

multiple machines of a network configured with applications implemented in a non-transitory computer-readable medium and to process on the multiple machines; and a particular machine of the network configured with a data analyzer implemented in a non-transitory computer-readable medium and to process on the particular machine;

each application produces application data defined by its own schema and the data analyzer parses the application data using the schemas and further uses merge rules and policies to map the application data to a master data source, the merge rules acquired from a master schema that ties the schemas together via the merge rules, and matching rules are acquired for the master schema and in response to a predefined policy that associates patterns or data types between the two schemas, and the matching rules permit a first data type in a first data source to be mapped to a second data type in the second data source even when a first data type is different from the second data type, the data analyzer also generates a merge report having metrics that a user can use to dynamically jump from an area identified in the merge report, while viewing the metrics, to a particular location in application data to dynamically make corrections in the data source, wherein the metrics including pattern variations for both of the first and second data types, frequency of a particular pattern for a particular one of the first and second data types that occurs within one of the data sources, identifying data source entries where sub data types are missing under a parent data type when required to present in accordance with one schemas.

22. The system of claim 21, wherein the data analyzer iterates the application data a configurable number of times in response to modified merge rules and modified policies.

23. The system of claim 21, wherein the data analyzer generates the merge report, a duplicate data report, a white list report, and a black list report.

24. The system of claim 21, wherein the data analyzer also uses the master schema to assist in mapping to the application data to the master data source.

25. The system of claim 21, wherein the master data source acquires a unique identity from an identity manager that processing on a machine of the network, and wherein security restrictions are enforced against the master data source via the identity manager.

* * * * *